(12) United States Patent
Ryan et al.

(10) Patent No.: US 7,628,923 B2
(45) Date of Patent: Dec. 8, 2009

(54) CARBON PRE-TREATMENT FOR THE STABILIZATION OF PH IN WATER TREATMENT

(75) Inventors: Thomas Anthony Ryan, Cheshire (GB); Harry Sharrock, Wigan (GB)

(73) Assignee: Calgon Carbon Corporation, Pittsburgh, PA (US)

( * ) Notice: Subject to any disclaimer, the term of this patent is extended or adjusted under 35 U.S.C. 154(b) by 0 days.

(21) Appl. No.: 11/754,401

(22) Filed: May 29, 2007

(65) Prior Publication Data

US 2008/0073290 A1 Mar. 27, 2008

Related U.S. Application Data

(63) Continuation-in-part of application No. 11/534,817, filed on Sep. 25, 2006.

(51) Int. Cl.
*C02F 1/28* (2006.01)
*C02F 1/66* (2006.01)
(52) U.S. Cl. .................. 210/694; 210/749; 502/430; 423/460
(58) Field of Classification Search ................ 210/749, 210/681, 694, 691, 661, 192, 282, 500.1, 210/501, 502.1, 503, 504, 506; 502/180, 502/416, 417, 430, 434, 11, 34, 27; 423/445 R, 423/449.1, 449.2, 449.3, 460
See application file for complete search history.

(56) References Cited

U.S. PATENT DOCUMENTS 4,410,472 A * 10/1983 Grubbs et al. ............... 502/418
5,876,607 A    3/1999 Farmer et al.
2002/0148784 A1* 10/2002 Roodman et al. ........... 502/416

OTHER PUBLICATIONS

Gu, et al., "Drying of an Activated Carbon Column after Steam Regeneration," Chem. Eng. Technol. 22 (1999) 10, 859-864.*
Encarta online dictionary definition of "Partition Coefficient" accessed Oct. 21, 2008.*

* cited by examiner

*Primary Examiner*—Matthew O Savage
*Assistant Examiner*—Lucas Stelling
(74) *Attorney, Agent, or Firm*—Cohen & Grigsby, P.C.

(57) ABSTRACT

Treatment of un-wetted or low moisture activated carbon with a suitable quantity of carbon dioxide provides a material which, on contact with water, controls pH in treatment water. Use of this treated activated carbon in a water treatment system provides water having an essentially neutral pH which is immediately potable thereby eliminating the necessity to drain and dispose of any soak water. The contact pH of the treated carbon remains within the potable pH range for treatment of more than 100 bed volumes. Additionally, the modified carbon may minimize metal leaching from contaminants in the water.

17 Claims, 11 Drawing Sheets

CARBON PRE-TREATMENT FOR THE STABILIZATION OF PH IN WATER TREATMENT

REFERENCE TO RELATED APPLICATION

This application claims priority to and is a continuation-in-part of U.S. application Ser. No. 11/534,817, filed Sep. 25, 2006.

FIELD OF INVENTION

The present invention relates to a method for treating water to neutralize and maintain pH in water treatment systems and may minimize metal leaching from contaminants in the water and, more particularly, to a dry activated carbon treated with small predetermined quantities of carbon dioxide.

BACKGROUND OF THE INVENTION

Activated carbon is commonly used in the water industry for the removal of a variety of contaminants. Such contaminants include, for example: chlorinated, halogenated organic compounds (such as trihalomethanes), adsorbable organic halogens (AOX), odorous materials, coloured contaminants, compounds for biological treatment systems, aromatics, pesticides, etc. Unfortunately, irrespective of the precursor source or whether the activated carbon is virginal or reactivated, activated carbon imparts an alkaline character to water upon contact. As a result, the pH of the effluent can rise to a value exceeding 9 or 10. This excursion in alkalinity, commonly referred to as a pH spike, can result in the leaching of aluminium from the activated carbon and, additionally, the leaching of manganese and other transition metals from reactivated carbon. The net effect of this increased alkalinity is that large quantities of high-pH water are wasted by the need for excessive backwashing/extraction of the carbon in order to bring the pH back to within the potable range. This remedial activity can last for several days, sometimes requiring as many as 800 bed volumes of water. Considering that water beds used in water treatment plants generally have capacities of 2 to 50 cubic meters, remediation can require a significant volume of water.

U.S. Pat. No. 5,876,607 assigned to Calgon Carbon Corporation describes a method for treating water to control pH and aluminium concentration in the water using activated carbon (exemplified by F400) soaked with water then treated with either carbon dioxide or carbon dioxide followed by air. Such use of carbon is occasionally employed, but has not become part of common industrial practice owing to the high costs involved in draining and disposal of the initial soak water necessary to wet the carbon in preparation for carbon dioxide treatment. Additionally, the transportation burden of the water wetted carbon, and even then the continued need for a number of bed-washes to stabilize the waters' pH has prevented common use of the method.

Thus, there is a need for a more effective and efficient process for treating water with activated carbon that reduces any excessive pH rise and consequent increase of metal ion concentration in water, and a process that overcomes the shortcomings of the prior art. It is also desirable to provide a satisfactory means of making efficient contact of the carbon dioxide with the activated carbon to be used for the water treatment application.

SUMMARY OF THE INVENTION

The present invention provides an activated carbon with reduced contact pH and a method for treating water with activated carbon that reduces excessive pH rise in the water and leaching of selective metals. The method comprises first treating an activated carbon with carbon dioxide for a predetermined amount of time, and second, contacting the water to be treated with an appropriate amount of the treated activated carbon. The method using treated activated carbon can be employed in adsorption/filtration systems for the purification of water.

The starting carbon may be activated or reactivated carbon. It is to be used in the condition "as received," which is generally dry and not purposely wetted. There is no need to purposely dry the carbon to a condition drier than as it was upon receipt from the plant in which it was produced provided it is of low moisture. As used herein, the term "dry" when used to define the carbon means the carbon has not reached or exceeded an incipient wetness level. Incipient wetness refers to the condition when just enough liquid has been added to a porous solid to fill all of the pores. If more liquid were added, it would coat the outer surface. As used herein, any carbon that reaches or exceeds the incipient wetness level would be considered a "wet" carbon. In an embodiment of the present invention, the dry carbon contains less than 60% moisture. In another embodiment, the carbon contains less than 40% moisture. In another embodiment, the carbon contains less than 15% moisture and, preferably, less than 2% moisture A sufficient amount of the dry, un-wetted activated carbon is then treated by exposing it to carbon dioxide. Exposure is conducted for an amount of time sufficient to achieve about 0.1-10% loading of carbon dioxide by weight of said carbon. In most examples, loading would be less than about 2% carbon dioxide. In another example, it is less than about 1% preferably, about or less than about 0.5% carbon dioxide. The exposure time is calculated based upon the contact pH of the activated carbon employed and the initial pH of the water to be treated. The activated carbon is loaded with carbon dioxide, for example, by flow of a gas comprised substantially of carbon dioxide through a bed of activated carbon. The flow rate employed is determined by the $CO_2$ loading required for any given exposure time. Preferably the carbon is in the form of pellets, granules or the like. Alternatively, in an example, solid carbon dioxide (dry ice) is added to activated carbon. This latter means of treatment offers the further benefits of convenience and accurate measurement. Such benefits are particularly useful for larger scale use, for example in water treatment facilities.

The treated activated carbon is then contacted with the water to be treated. Generally, about one bed volume of the treated carbon is employed. The specific amount of activated carbon depends upon the size of the filter bed.

The addition of carbon dioxide to dry, low moisture activated carbon was surprisingly found to enable effective control and maintenance of the alkalinity of treatment water to within the potable range. It is believed that carbon when treated in this way provides a beneficial buffer. The dry carbon makes efficient use of the buffer through "buffering action."

The activated carbon generates hydroxyl ions, the concentration of which governs the extent of carbon dioxide desorption from the activated carbon, the degree of hydration to carbonic acid and the subsequent dissociation of the acid. It is contemplated that some of the carbon dioxide is desorbed from the treated carbon upon addition of water to give a partition between the adsorbed and aqueous phases:

$$CO_2(ads)=CO_2(aq).$$

The $CO_2$ (aq) phase is in equilibrium with carbonic acid, vis:

$$CO_2+H_2O=H_2CO_3$$

Hydroxyl ions present, or formed, on the carbon then combine with the hydrogen ions arising from the dissociation of the carbonic acid to form unionised water:

$$H_2CO_3 \ = \ H^+ \ + \ HCO_3^-$$
$$\downarrow OH^-$$
$$H_2O$$

It is believed this last equilibrium will be disturbed by the presence or generation of hydroxyl ions, and more carbonic acid will be dissociated to replace the hydrogen ions that were removed.

The inventors have discovered that by using a dry, low moisture carbon that enables a controlled partition of carbon dioxide between the adsorbed and aqueous phases, carbon dioxide can remain available to neutralize the high pH when the carbon dioxide-laden carbon is contacted with the water to be treated. Despite the general belief that carbon dioxide would not adsorb well onto carbon and would only be retained if the carbon was wetted, it was found that the carbon dioxide penetrates deep inside the pores of dry activated carbon. It was not previously realized that an aqueous phase actually blocked access to the carbon in the prior process using wetted activated carbon, as in U.S. Pat. No. 5,876,607, and thus water inhibited the access of carbon dioxide into the micropores. As a result, carbon dioxide was mostly adsorbed into the water layers and readily lost to the aqueous phase. With the carbon dioxide mainly in the aqueous phase, it would have been removed in the first stages of washing.

An advantage of the present invention resulting in part from its ability to directly adsorb carbon dioxide from the gas phase is a reduction of time and, therefore, cost. The invention may also obviate the need for excessive backwashing and the need to remove voluminous quantities of wasted water. The pH of the water being contacted with carbon dioxide-treated carbon will very quickly become within the generally accepted, potable pH range of 6.5 to 8.5. It will remain within the potable range after treatment with the carbon dioxide-laden carbon even after treatment with 100 bed volumes. Judging by the trends of the results illustrated by the curves shown in the Figures disclosed herein, the inventors contemplate that the pH would remain within the potable range thereafter. It is contemplated that water savings could be up to 800 bed volumes multiplied by as many as 50 cubic meters, or 40,000 cubic meters of water. Savings on carbon dioxide could also be appreciable.

Figure 5:
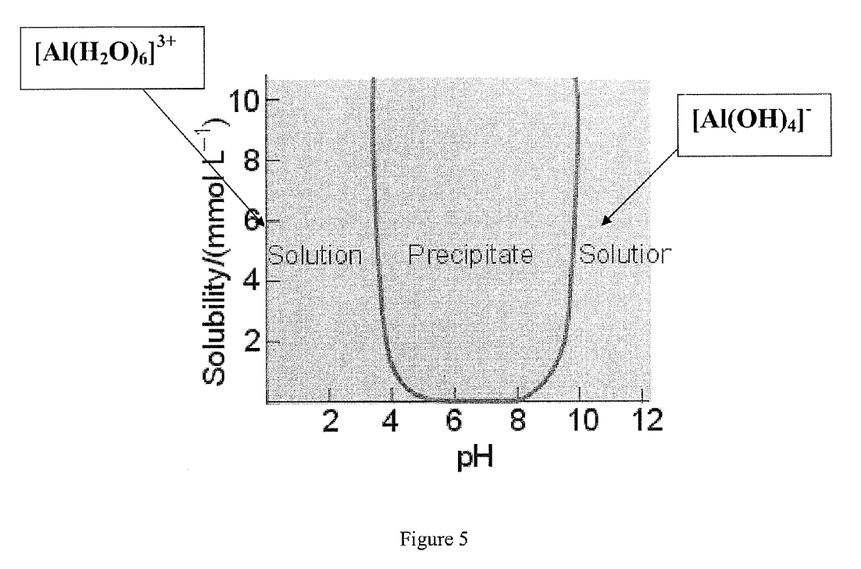
FIG. 5 shows the effect of pH on the solubility of alumina in an example of an embodiment of the present invention.

The inventors have also discovered that this inventive process is useful to control metal contamination of the water. Acidity and basicity have a profound effect on the solubility of alumina. If the water is acidic (pH<6.5) then alumina dissolves as the hexaquo ion, $[Al(H_2O)_6]^{3+}$. If the water is alkaline (pH>8.5) the alumina dissolves as the hydroxyaluminate, $[Al(OH)_4]^-$ species, as illustrated in FIG. 5. Other metals can show similar effects. Particularly, such other metals may include metal oxide or hydroxide-containing species that have an increased solubility in water of high alkalinity and that may constitute a potential contaminant to the water which they may contact. In practice, aluminium and iron can present a problem at high pH and manganese can be a problem at low pH. The present novel carbon and treatment method for controlling pH has been shown to lead to the control of metal leach.

It is an object in an embodiment of the present invention to provide a process of water treatment that reduces pH and the concentration of selective, leachable metals (such as aluminium and manganese) during the start-up phase of aqueous adsorption systems (such as initial potable fills). In an embodiment it is an object to reduce or remove pH spike and maintain the pH of the water in the potable range right from the initial contact with the carbon. Another embodiment provides a modified activated carbon effective for reducing or removing pH spike. It is still a further object in an embodiment to provide a convenient and efficient means for pretreating carbon for larger scale water treatment facilities.

Other objects, features, aspects and advantages of the present invention will become better understood or apparent from the following detailed description, drawings, and appended claims of the invention.

DETAILED DESCRIPTION OF EXAMPLES OF THE INVENTION

Activated carbon (as received Filtrasorb400, 12×40 US mesh) was transferred to a glass container fitted with a dip pipe and exposed to a flow of various quantities of carbon dioxide to give carbon dioxide loadings varying from 0.1 to 10% by weight. For a preferred example, the loadings vary from 0.2 to 5%. The latter representing the maximum amount of carbon dioxide that can be taken up by the carbon. Depending upon the selected carbon, it may be excessive for this application, resulting in carbons that would impart too much acidity to the water and be below the potable pH value. Appropriate loadings are determined by applying a convenient flow rate of carbon dioxide based on the weight of the gas for the required amount of time—ml/min×total minutes gives total volume. The carbon is weighed before and after the gas is flowed through and the weight uptake is confirmation of the final loading. Untreated activated carbons were used as the control, and a carbon prepared by the method of U.S. Pat. No. 5,876,607 was used for comparison. Additional work was carried out using reactivated carbon (as received F400 React, 12×40 US mesh, ex. Feluy) loaded with carbon dioxide at approximately 0.3 and 0.5% w/w, respectively, as further described below.

EXAMPLE 1

Samples of untreated carbon and carbon treated as described above in amounts of 100 cm$^3$ were added, in turn, to two bed volumes of water locally supplied by Ashton-in-Makerfield Township with stirring. The initial pH of the local water was 7.44. The contact pH was recorded after 30 minutes. The water was then decanted and two bed volumes of fresh Township water were added. This process was repeated a number of times to represent the effect of additional bed volumes. The contact pH was plotted as a function of the number of water bed volumes. Results are shown in FIG. 1.

All experiments were conducted at the laboratory ambient temperature and pressure. The laboratory bed volume measured 200 cubic centimeters (i.e. two bed volumes stated above).

Untreated Virgin Carbon

Figure 1:
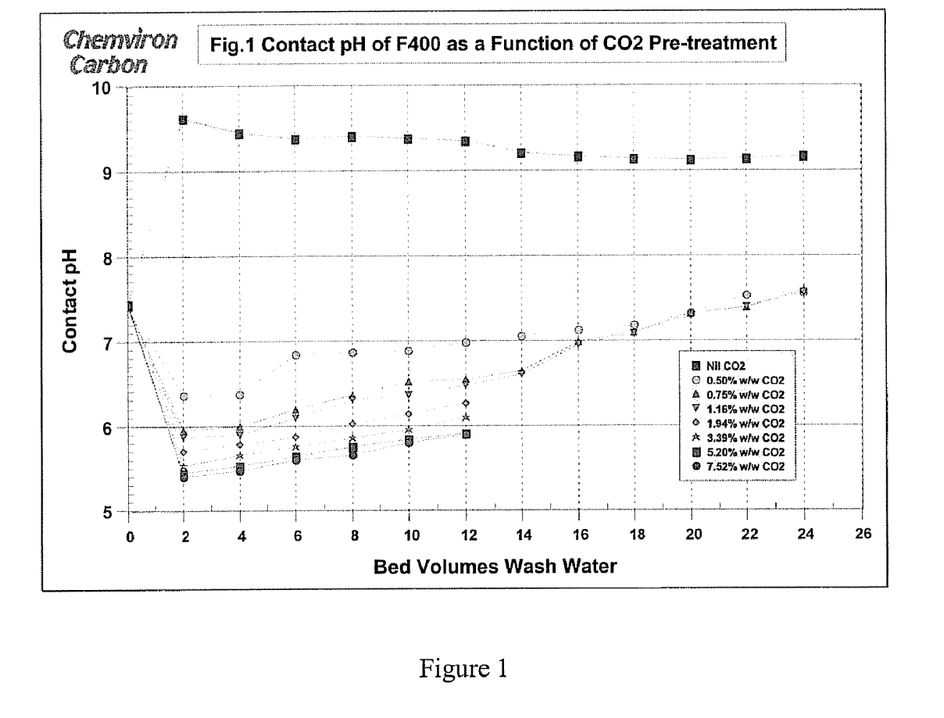
FIG. 1 graphically illustrates the pH profile that occurs following water treatment with one untreated carbon and seven treated samples of carbon each having different weight for weight carbon dioxide loading according to examples of the present invention.

Addition of two bed volumes of the town's water to untreated F400 activated carbon resulted in the anticipated pH spike as illustrated in FIG. 1. The pH of the water was 7.44 but rose to 9.62 when added to untreated activated carbon. This immediate increase in pH to 9.62 was followed by a very slowly reducing level of alkalinity with increasing bed volumes of water added. After about 25 bed volumes were added, the alkalinity of the water in this system (equivalent to a pH of about 9.2) was still beyond the upper potable pH range of 6.5-8.5. This result was consistent with the findings disclosed in the U.S. Pat. No. 5,876,607 which demonstrated that return of the water to a potable condition, when using untreated F400 with the particular water supply (Robinson Township Municipal Authority tap water), did not occur until almost 200 bed volumes had been applied.

Treated Virgin Carbon

Figure 2:
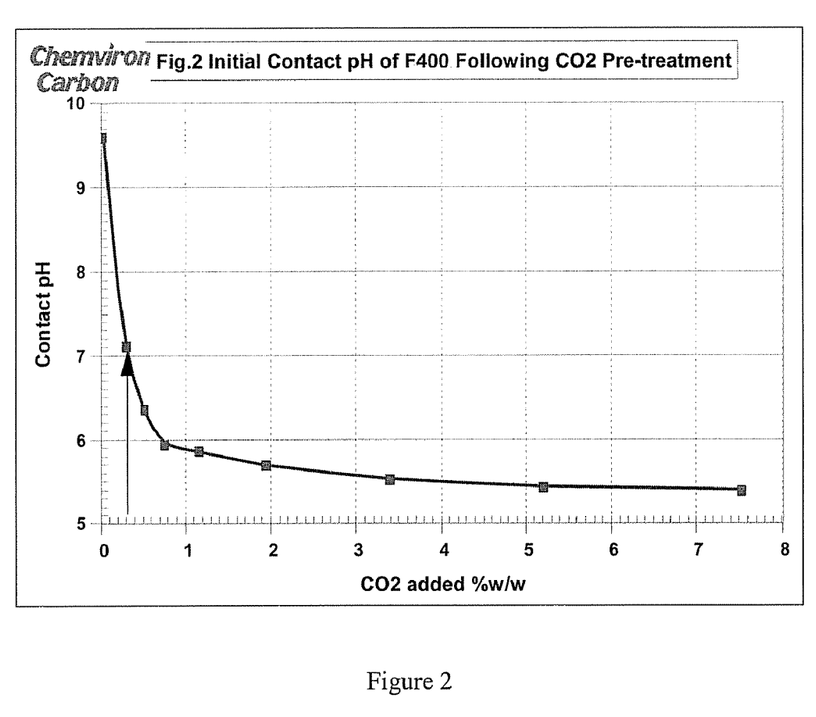
FIG. 2 graphically illustrates the initial contact pH as a function of the carbon dioxide loading on activated carbon resulting from exposure of the water to the carbon in an example of an embodiment of the present invention.

Samples of F400 activated carbon were treated with varying quantities of carbon dioxide. Each sample was contacted with two bed volumes of water from Ashton-in-Makerfield Township. The water had an initial pH of 7.44. The contacted water experienced an immediate decrease in the effluent water's pH. The degree to which the decrease occurred was noted to be a function of the amount of carbon dioxide added. For example, F400 carbon saturated with carbon dioxide (corresponding to a loading of 7.52%) gave the biggest fall, to about 5.4 pH. A loading of only 0.5% carbon dioxide gave a drop in pH to about 6.4. The influence of carbon dioxide loading on initial contact pH is illustrated in FIG. 2.

The contact pH corresponding to 0% carbon dioxide loading is that resulting from exposure of the water to untreated carbon. Knowledge of this value together with the other experimental points illustrated in FIG. 1 enables the loading of carbon dioxide (to give an initial contact pH of 7.0) to be inferred by interpolation. Hence, from the graph, a loading of 0.3% carbon dioxide should produce an initial contactpH of 7.0. In practice this loading gave a measured initial contact pH 7.12.

Figure 3:
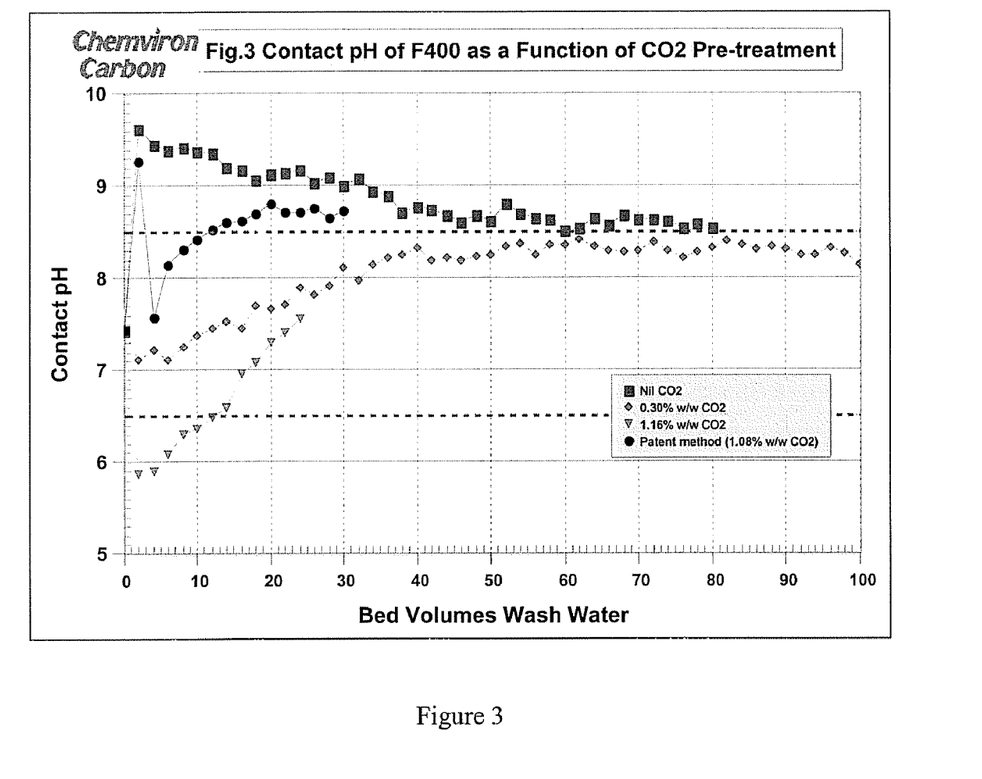
FIG. 3 graphically illustrates the contact pH of F400 carbon with 0.3% carbon dioxide by weight as a function of added bed volumes of water (♦ line), and compares it to the effects of untreated carbon (■ line), wet, activated carbon, treated with carbon dioxide (● line), and un-wetted modified carbon (▼ line) in an example of an embodiment of the present invention.

The contact pH of F400 carbon with 0.3% carbon dioxide loading is illustrated in FIG. 3 as a function of added bed volumes (♦ line). This can now be compared to the effect of untreated carbon (■ line) requiring some 80 bed volumes before the water pH reached the top of the potable pH range, and to the effect of wet, activated carbon, treated with carbon dioxide as described in the U.S. Pat. No. 5,876,607 (● line). In that patent, the quantity of carbon dioxide applied to the wetted carbon was 1.08% (additional amounts were shown to be of no advantage). For further comparison, a similar quantity of carbon dioxide was applied to un-wetted treated carbon (▼ line).

According to the patented method, F400 carbon was soaked in an unspecified quantity of water for 16 hours before being drained and subsequently treated with carbon dioxide, and this procedure was followed here. Two bed volumes of soak water were added to the F400 and left for 16 hours. The drained soak water had a pH of 9.27. The wetted carbon was then treated with carbon dioxide and a further two bed volumes of water were added to give a contact pH of about 7.6. This value rose above the upper potable range of 8.5 after the subsequent addition of 12 bed volumes of water, as observed in FIG. 3.

The dry 0.3% carbon dioxide-treated carbon delivered water with a pH in the standard, potable range throughout the course of the washings. Use of 0.5% carbon dioxide-treated carbon for this carbon-water system would likely result with a water pH that would be too acidic. Increasing the dry carbon dioxide loading to 1.16%, however, produced initially acidic water which was below the pH 6.5 threshold up to about 10 bed volumes.

The ideal loading of carbon dioxide varies depending upon the selected carbon and the water to be treated. For the best results in a particular situation a suitable amount of loading should be pre-determined, especially before conducting large scale water treatment. This determination may be aided with extrapolation from related tests or graph interpolation. As exemplified above, a 7.52% loading was excessive in this particular example because it gave too much of a pH drop (down to 5.4 in the last example). However, the appropriate amount of carbon dioxide for most situations involving carbon pre-treatment is expected to range from about 0.1 to 10% by weight of the carbon. In an example of an embodiment of the present invention the carbon dioxide loading is within the range from about 0.1 to 1.0% by weight of the carbon.

Treated Reactivated Carbon

Figure 4:
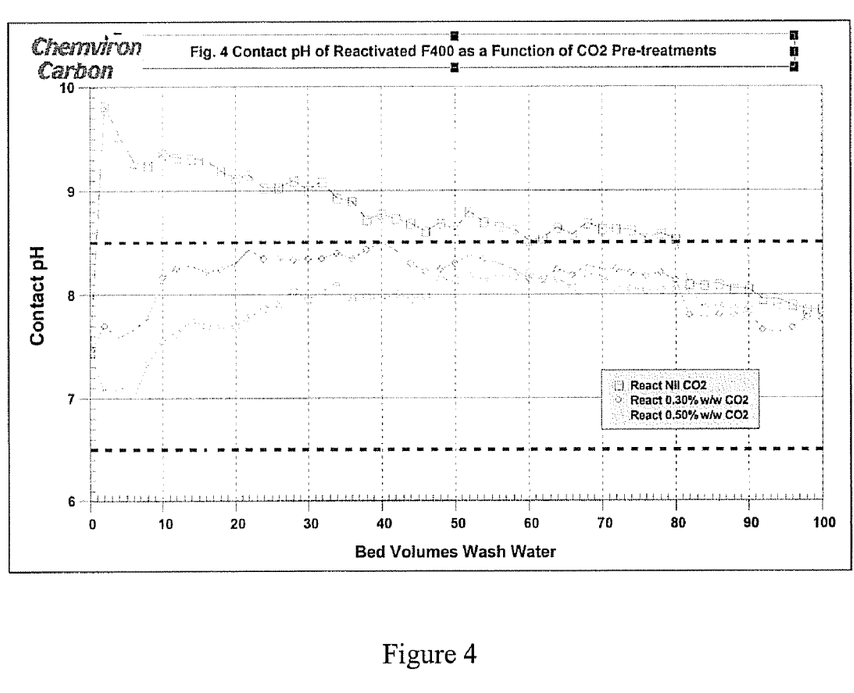
FIG. 4 graphically illustrates data for reactivated F400 carbon in an example of an embodiment of the present invention.

Data for reactivated F400 carbon is illustrated in FIG. 4. The □ open squares represent the pH of the water as a function of the number of bed volumes for untreated material. The ◇ and ○ lines represent the situation after pre-treatment with 0.3 and 0.5% carbon dioxide, respectively.

It is notable that the untreated, reactivated carbon required about 80 bed volumes to bring the water pH into the potable range whereas both the carbon dioxide-treated carbons are consistently and immediately within the potable range.

EXAMPLE 2

Figure 6:
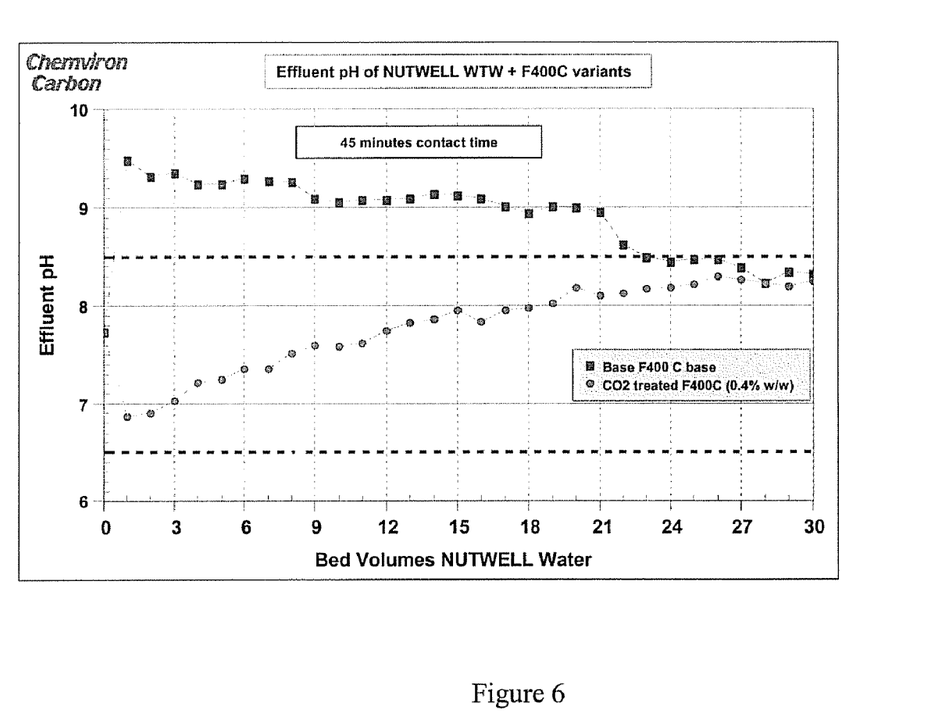
FIG. 6 graphically illustrates the effluent pH as a result of water treatment using a modified carbon according to an example of the present invention.

Activated carbon (as received F400 carbon) was treated by exposing it to a flow of carbon dioxide gas to give a loading of 0.4% weight carbon dioxide by weight of the carbon. A loading of 0.4% carbon dioxide was pre-selected based on anticipated condition similarities with the prior example. A sample of treated carbon was used to contact raw feed waters from Nutwell Water Treatment Works (Yorkshire Water). For comparison, a sample of untreated carbon was also contacted with the feed water. Each sample was contained in a laboratory bed column measuring 200 cubic centimeters. A notional contact time of 45 minutes was used. The pH of each treated effluent was measured at one bed-volume intervals over 30 bed volumes. Results of the two samples show a comparison of the effluent pH property of F400 carbon both with and without $CO_2$ pre-treatment as illustrated in FIG. 6.

EXAMPLE 3

Figure 7:
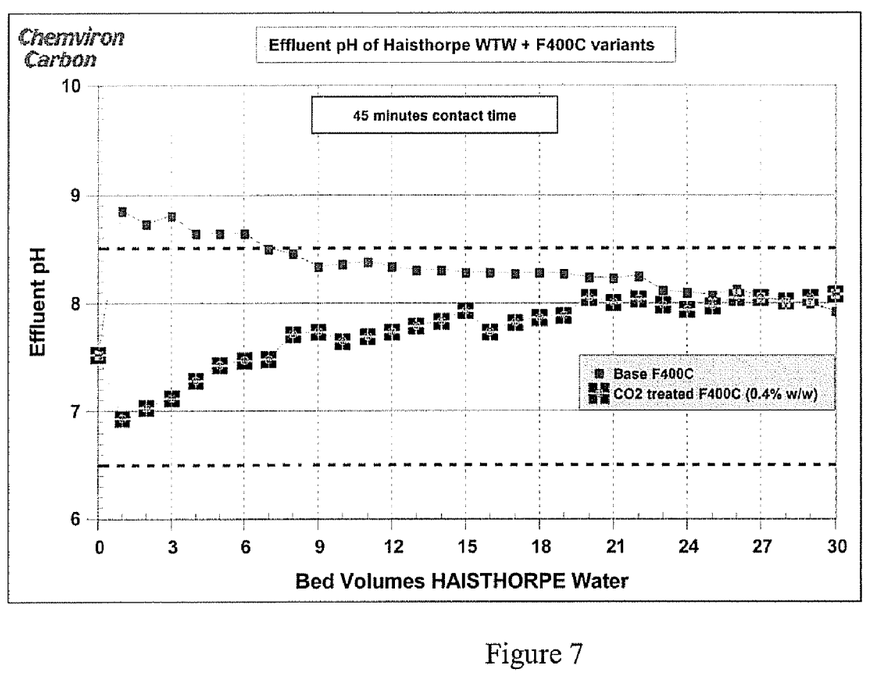
FIG. 7 graphically illustrates the effluent pH as a result of water treatment using a modified carbon according to another example of the present invention.
Figure 8:
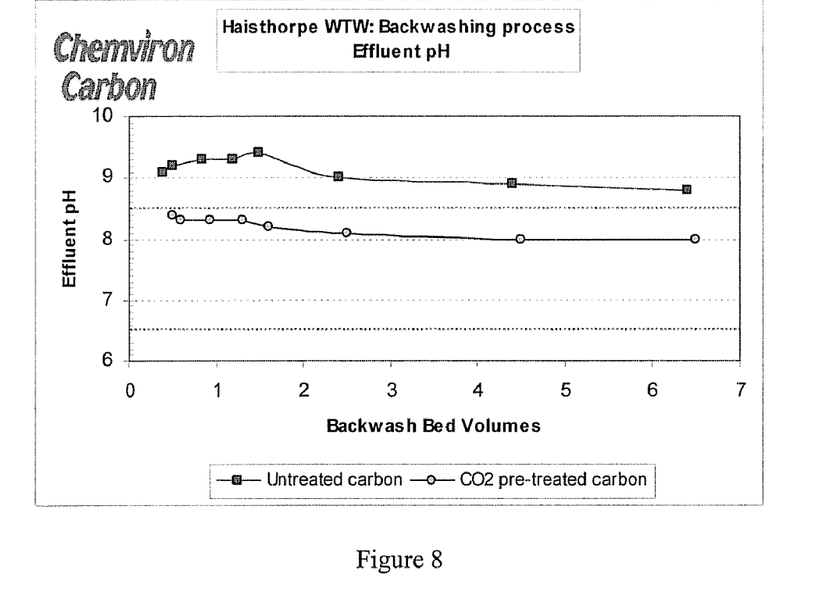
FIG. 8 graphically illustrates the effluent pH as a result of water treatment using a carbon modified according to an example of the present invention.
Figure 9:
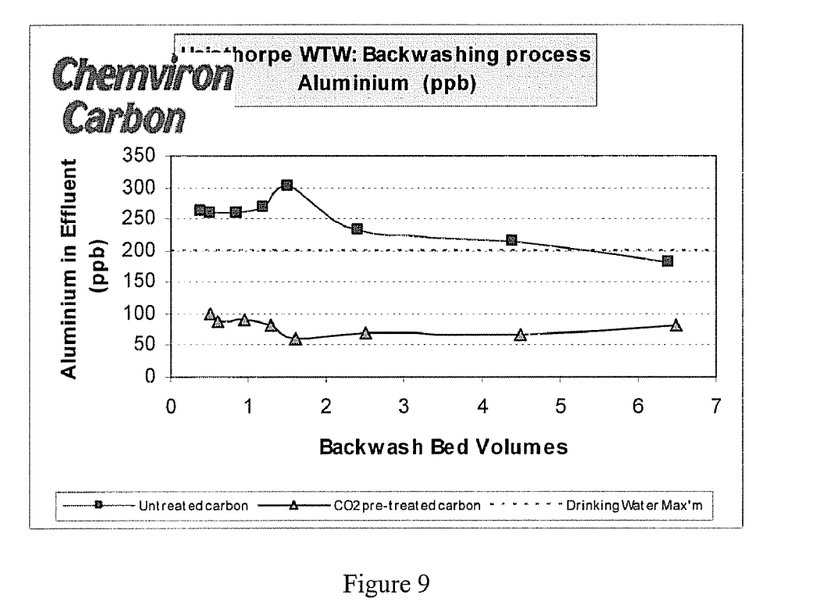
FIGS. 9-11 graphically illustrate the effect of water treatment using a water treatment method according to an example of the present invention on metal leaching.
Figure 10:
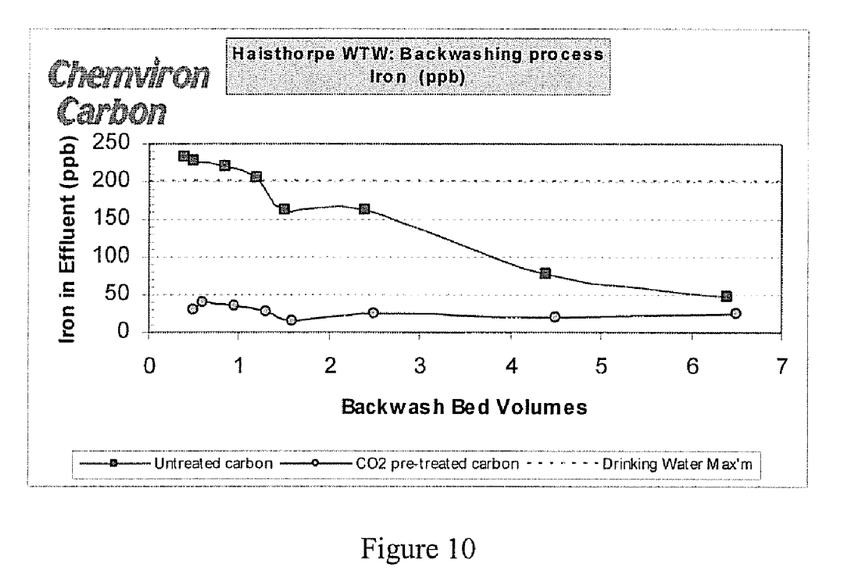
Figure 11:
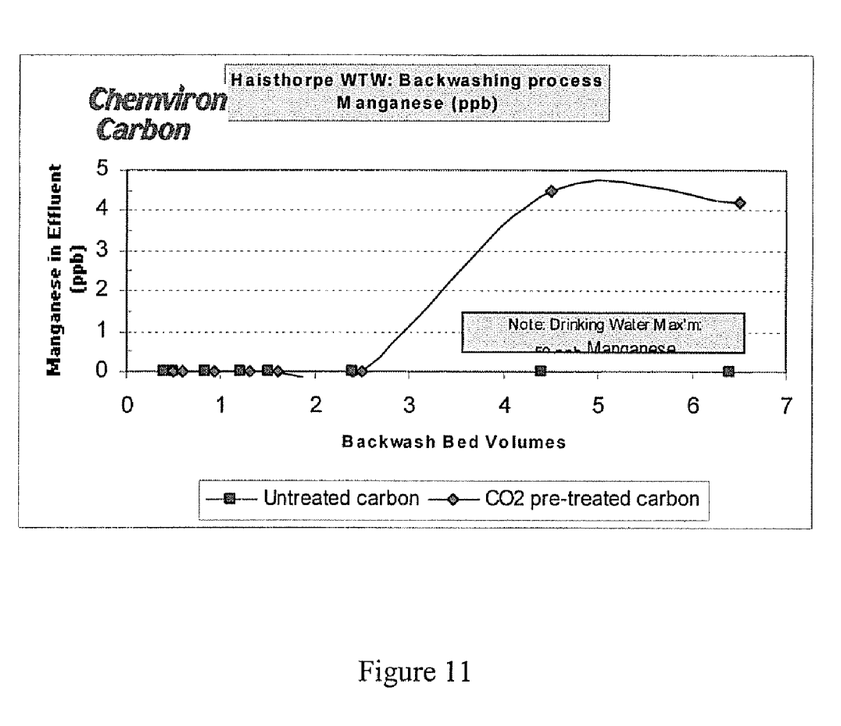

Additional samples of untreated carbon and carbon treated as described in Example 2, and contacted with water from the Haisthorpe Water Treatment Works (Yorkshire water). Results of water treatment with the carbon samples are illustrated in FIG. 7.

Neither of the Nutwell or Haisthorpe waters tested appeared to be particularly troublesome, indicating that only a minimal number of washes would be required during commissioning to bring the pH of the water to within the potable range. Nevertheless, treatment of the Filtrasorb 400 carbon with 0.4% w/w carbon dioxide gas produced effective nullification of the initial pH spike for both water samples, which were immediately measured to be within the potable limits, indicated by the dotted lines in FIGS. 6 and 7.

EXAMPLE 4

In addition to the laboratory-scale studies described in Examples 1, 2 and 3 above, a plant-scale trial was undertaken at the Haisthorpe Water Treatment Works (Yorkshire Water) to further demonstrate the effectiveness of carbon pre-treated with $CO_2$ in water treatment according to examples of the present invention.

A trial was conducted during carbon filter bed commissioning operations. Thirty-three one-cubic meter quantity samples of activated carbon (33 $m^3$ as-received base Chemviron F400 carbon) having moisture level notionally below 2% were treated with solid carbon dioxide to 0.5% w/w $CO_2$ by intermittent mixing. In an example, the mixing was conducted during a tanker filling procedure. A weighed amount of solid $CO_2$ (2.5 kg, in the form of dry ice pellets) to represent the required addition was evenly distributed by hand throughout each of the one-cubic meter increments of carbon as they were filled into the tanker. Quantities of treated and untreated carbon were used to fill one of each of the two Haisthorpe filter beds, respectively. Each of the beds was filled with 33 cubic meters of activated carbon, which corresponds to approximately 14.85 metric tons of F400 carbon each, and then contacted with Haisthorpe water. In an example, distribution was conducted to provide a generally homogeneous mixture of carbon dioxide and carbon. In another example of an embodiment of the present invention solid carbon dioxide was randomly or unevenly distributed into activated carbon.

The effluent waters during backwash commissioning of both filter beds were collected at various stages of bed-volumes flow-through and each was tested for pH property, and aluminium, manganese and iron content.

Previous laboratory studies using Haisthorpe water, detailed in Example 3, had indicated that 0.4% w/w $CO_2$ pre-treatment of F400 carbon had achieved an effective nullification of the initial pH spike to within potable limits.

FIGS. 8, 9, 10 and 11 illustrate various backwash water properties from the two filter beds representing the effect of untreated carbon (■ line) with that of $CO_2$ treated carbon, at various bed volumes. For comparison purposes, the respective, typical, UK. Drinking Water Supply Limit values are also indicated. Results of the trial show that $CO_2$ pre-treatment effected a marked reduction in the backwash water pH property to bring it immediately within the potable range.

Additionally, metal leaching from contaminants in the water were generally minimized. Concentrations of aluminium and iron leach from the $CO_2$ treated filter carbon were significantly lower than from the untreated carbon filter, and, also, levels of contamination were immediately, and markedly, below the respective Drinking Water Supply Limits. While the concentration of manganese from the $CO_2$ pre-treated filter (4.5 μg/liter) was somewhat higher than that from the untreated carbon filter (as a direct consequence of the less alkaline water environment in the pre-treated filter) it was still significantly below the UK Drinking Water Supply Limit value of 50 μg/liter.

EXAMPLE 5

As an alternative to these methods of pre-treating carbon, in another example of an embodiment of the present invention, 0.5% w/w $CO_2$-loaded carbon was achieved by direct blending of a weighed proportion of $CO_2$-saturated F400 carbon with a weighed proportion of untreated F400 base carbon. The contact pH of the "blended" sample was determined and then compared with the contact pH of base untreated F400 carbon, and with a 0.5% w/w $CO_2$ pre-treated F400 carbon prepared directly by the methods described previously. Ashton Towns water (pH 7.44) was used for the contact pH testing. The following four carbon samples were prepared and tested for contact pH property:
  (i) Base F400 carbon having moisture level notionally below 2%;
  (ii) $CO_2$-saturated F400, prepared by placing a weighed amount of F400 base carbon in a glass container with dip-tube and exposing the carbon to a controlled flow of 100% $CO_2$ gas for a sufficient amount of time to achieve a saturation $CO_2$ uptake under ambient conditions, and re-weighed to indicate the saturated carbon sample had a $CO_2$ uptake of 8.38 g per 100 g;
  (iii) 0.5% w/w $CO_2$ pre-treated F400, prepared by exposing a weighed quantity of F400 base carbon to a controlled flow of 100% $CO_2$ for a governed adsorption time calculated to achieve the required 0.5% w/w $CO_2$ loading—the actual $CO_2$ loading was determined by the adsorption weight increase; and
  (iv) Blended sample (representing 0.5% w/w $CO_2$ loading), prepared from a weighed quantity of the $CO_2$-saturated carbon (6.47 g) prepared in sample (ii) above that was blended by intermixing with a weighed amount of F400 base carbon (94.03 g) from sample (i) above to achieve a calculated 0.5% w/w $CO_2$ loading of the carbon blend. In other examples, the carbon blend may be altered by varying the ratio of untreated carbon mixed with $CO_2$-treated carbon.

The respective recorded test values were as shown in Table 1 below:

TABLE 1

Contact pH as a function of $CO_2$ loaded carbon

| Carbon | Effluent pH |
|---|---|
| Base F400 carbon | 10.71 |
| $CO_2$ saturated F400 | 4.95 |
| 0.5% w/w $CO_2$ pre-treated F400 | 6.48 |
| Blended 0.5% w/w $CO_2$ loading | 6.58 |

The method of blending a $CO_2$ saturated carbon with a weighed proportion of untreated base carbon, by intermixing, gave a product equivalent to the method of direct loading of $CO_2$ throughout all the carbon.

EXAMPLE 6

Test Samples—Preparation

A series of carbon test samples was prepared to determine the effect of initial moisture content on the contact pH property of a $CO_2$ modified F400C grade carbon. Various weighed amounts of water were added to weighed quantities of oven dried F400C carbon. Water and dried carbon weights for each sample were calculated to produce various moisture contents of the carbon ranging from nil to ×%. After completion of water addition each prepared carbon sample was quickly stirred and then carefully transferred respectively to a labelled plastic bottle with screw-top fitment. The series of moisturized carbon samples was left to equilibrate for 16 hours at ambient conditions.

After equilibration, each of the moisturized test samples was further treated with a measured flow of 100% carbon dioxide gas (via a dip-tube assembly) for a flow time calculated to achieve a $CO_2$ loading of 0.5% w/w. The actual loading of $CO_2$ achieved was determined by sample weight increase, and, if required, an additional exposure to the $CO_2$ gas flow was effected.

The resulting 'carbon/moisture/$CO_2$' samples were allowed to re-equilibrate for 16 hours at ambient conditions.

For comparison purposes, a sample of the oven dried F400C carbon was also included in the test series (i.e. dried carbon base with no moisture or $CO_2$ additions).

The composition weights of the prepared test samples are detailed in Table 2 below:

TABLE 2

| | Sample Ref. | | | | | | | |
|---|---|---|---|---|---|---|---|---|
| | 1 | 2 | 3 | 4 | 5 | 6 | 7 | 8 |
| F400C (g) | 100 | 100 | 98 | 96 | 94 | 92 | 90 | 85 |
| Added H$_2$O (g) | Nil | nil | 2 | 4 | 6 | 8 | 10 | 15 |
| Added CO$_2$ (g) | Nil | 0.5 | 0.5 | 0.5 | 0.5 | 0.5 | 0.5 | 0.5 |

Contact pH Testing

For each of the eight 'carbon/moisture/$CO_2$' F400C carbon samples, a 100 cm$^3$ quantity was measured and was added to 100 cm$^3$ (i.e. 1 bed-volume) of water, locally supplied by Ashton-in-Makerfield Township, with stirring. The initial pH of the local water was 7.35. After 15 minutes contact time the pH of the carbon/water system was recorded.

Figure 12:
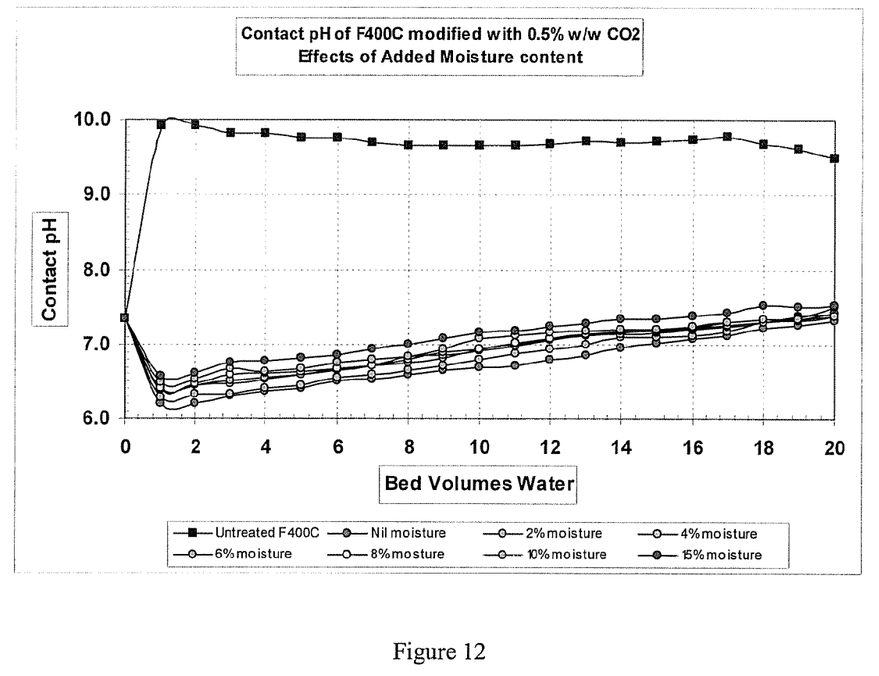
FIG. 12 shows the effect of moisture content on contact pH of modified carbon samples in an example of an embodiment of the present invention.

The excess water was then carefully decanted from the wetted carbon and an additional 1 bed volume of fresh Township water was added. The pH was again measured after 15 minutes contact time. This procedure was repeated twenty times to represent the effect of washing the carbon with additional bed volumes. The contact pH values obtained are shown plotted as a function of the number of water bed volumes in FIG. 12. These results clearly demonstrate that the drier the initial carbon is, the better the result. Notwithstanding this, all the results showed an improvement relative to the untreated carbon.

EXAMPLE 7

Test Samples—Preparation

As an extension to the contact pH studies reported in Example 6, a further experimental study was undertaken to determine the effects of even higher loadings of initial water content on the contact pH property of a $CO_2$ modified carbon. Moisture levels ranging from 20% to 60% on a $CO_2$ modified F400C grade carbon were investigated.

A series of five carbon test samples was prepared for the study by variously adding a weighed amount of water to a weighed quantity of an oven dried F400C carbon. Water and dried carbon weights for each test sample were calculated to thus produce the required moisture contents of 20, 30, 40, 50 and 60%. After completion of water addition each prepared carbon sample was quickly stirred and then carefully transferred respectively to a labelled plastic bottle with screw-top fitment. The moisturized carbon samples were then left to equilibrate for 16 hours at ambient conditions.

After equilibration, each of the moisturized test samples was $CO_2$ treated with a measured, flow of 100% carbon dioxide gas (via a dip-tube assembly) for a flow time calculated to achieve a $CO_2$ loading of 0.5% w/w. The actual loading of $CO_2$ achieved was determined by sample weight increase, and, if required, an additional exposure to the $CO_2$ gas flow was effected.

The 'carbon/moisture/$CO_2$' samples were allowed to re-equilibrate for 16 hours at ambient conditions.

The five prepared samples were designated as Samples 9 to 13 and their composition weights are detailed in Table 3 below.

TABLE 3

| | Sample Ref. | | | | |
|---|---|---|---|---|---|
| | 9 | 10 | 11 | 12 | 13 |
| F400C (g) | 80 | 70 | 60 | 50 | 40 |
| Added H$_2$O (g) | 20 | 30 | 40 | 50 | 60 |
| Added CO$_2$ (g) | 0.5 | 0.5 | 0.5 | 0.5 | 0.5 |

Contact pH Determinations

For contact pH testing of each moisturized sample prepared above, a 100 cm$^3$ quantity was measured and was added to 100 cm$^3$ (i.e. 1 Bed-volume) of water locally supplied by Ashton-in-Makerfield Township. The initial pH of the local township water was 7.35. The pH of the carbon/water system was recorded after 15 minutes of contact time.

The excess water was then carefully decanted from the wetted test carbon and an additional 1 bed volume of fresh Township water was added. The contact pH was again measured after 15 minutes. This procedure was repeated twenty times to represent the effect of carbon washing with the additional water bed volumes.

Figure 13:
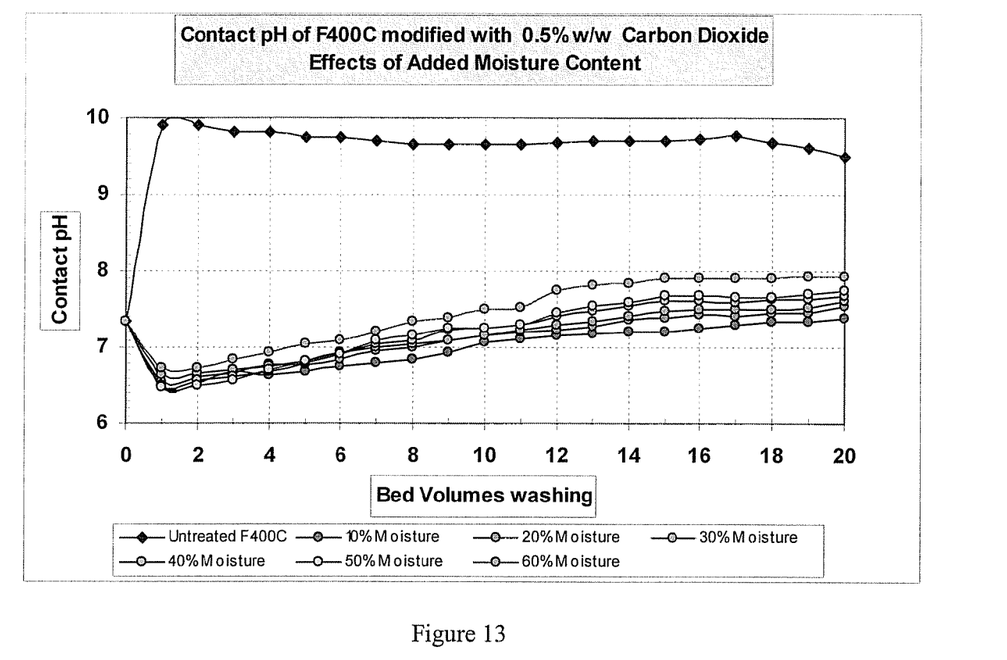
FIG. 13 illustrates the contact pH of modified F400C as a function of moisture addition and bed volumes washing in an example of the present invention.

The contact pH values obtained for the additional five test samples are included in Table 4 and the contact pH values for are plotted as a function of the number of water bed volumes in FIG. 13.

For comparison purposes, also included in the result are the respective contact pH values determined previously in Example 6 for both Sample 1 an untreated oven dried F400C carbon with no pre-moisture or $CO_2$ additions, and for the previous Sample 7 which represented 10% initial moisture addition before $CO_2$ modification.

TABLE 4

Contact pH as a Function of Moisture Addition and Bed Volumes Washing

| | Ref. No. | | | | | | |
|---|---|---|---|---|---|---|---|
| | 1 | 7 | 9 | 10 | 11 | 12 | 13 |
| | | | | F400C (g) | | | |
| | 100 | 90 | 80 | 70 | 60 | 50 | 40 |
| | | | | Moisture added (g) | | | |
| | nil | 10 | 20 | 30 | 40 | 50 | 60 |
| | | | | $CO_2$ added (g) | | | |
| Bed Volumes Water | nil | 0.5 | 0.5 | 0.5 | 0.5 | 0.5 | 0.5 |
| | | | | Contact pH | | | |
| 0 | 7.34 | 7.34 | 7.34 | 7.34 | 7.34 | 7.34 | 7.34 |
| 1 | 9.91 | 6.48 | 6.54 | 6.63 | 6.50 | 6.47 | 6.73 |
| 2 | 9.92 | 6.52 | 6.62 | 6.65 | 6.57 | 6.51 | 6.73 |
| 3 | 9.82 | 6.68 | 6.65 | 6.70 | 6.62 | 6.57 | 6.85 |
| 4 | 9.82 | 6.63 | 6.78 | 6.76 | 6.68 | 6.70 | 6.93 |
| 5 | 9.76 | 6.68 | 6.78 | 6.82 | 6.80 | 6.82 | 7.04 |
| 6 | 9.76 | 6.76 | 6.85 | 6.93 | 6.91 | 6.91 | 7.10 |
| 7 | 9.70 | 6.79 | 6.95 | 6.99 | 7.05 | 7.10 | 7.21 |
| 8 | 9.65 | 6.84 | 7.00 | 7.05 | 7.09 | 7.16 | 7.33 |
| 9 | 9.66 | 6.94 | 7.10 | 7.09 | 7.22 | 7.25 | 7.39 |
| 10 | 9.66 | 7.07 | 7.16 | 7.16 | 7.26 | 7.25 | 7.50 |
| 11 | 9.66 | 7.12 | 7.20 | 7.23 | 7.30 | 7.30 | 7.52 |
| 12 | 9.68 | 7.16 | 7.22 | 7.30 | 7.42 | 7.45 | 7.76 |
| 13 | 9.71 | 7.18 | 7.28 | 7.34 | 7.47 | 7.55 | 7.82 |
| 14 | 9.70 | 7.20 | 7.36 | 7.40 | 7.55 | 7.60 | 7.85 |
| 15 | 9.71 | 7.20 | 7.39 | 7.47 | 7.62 | 7.68 | 7.91 |
| 16 | 9.73 | 7.24 | 7.44 | 7.49 | 7.62 | 7.68 | 7.90 |
| 17 | 9.78 | 7.29 | 7.42 | 7.51 | 7.60 | 7.65 | 7.92 |
| 18 | 9.68 | 7.34 | 7.45 | 7.49 | 7.63 | 7.67 | 7.92 |
| 19 | 9.62 | 7.35 | 7.45 | 7.52 | 7.63 | 7.71 | 7.94 |
| 20 | 9.49 | 7.38 | 7.54 | 7.62 | 7.68 | 7.74 | 7.93 |

As demonstrated by the various examples, addition of carbon dioxide to carbon improved the carbon's water treatment capabilities. In further examples, the drier the carbon was prior to addition the greater the carbon performance results.

While the foregoing has been set forth in considerable detail, it is to be understood that the detailed embodiments and Figures are presented for elucidation and not limitation. Process variations may be made, but remain within the principles of the invention. Those skilled in the art will realize that such variations, modifications, or changes therein are still within the scope of the invention as defined in the appended claims.

What is claimed is:

1. A method for treating water to control excessive pH in treated water, said method comprising the following sequential steps:
   a. preparing a bed of dry activated carbon wherein said activated carbon contains less than 30% moisture,
   b. loading said activated carbon with carbon dioxide to about 0.1 to 2% by weight of said activated carbon wherein said loading is conducted by distributing solid carbon dioxide throughout said activated carbon, and
   c. contacting said water with said activated carbon that is loaded with said carbon dioxide to produce the treated water.

2. The method of claim 1 further comprising step (d) of providing the treated water with a pH in the potable range of about 6.5 to about 8.5.

3. The method of claim 1 wherein the activated carbon of step (a) contains less than 15% moisture.

4. The method of claim 1 wherein the activated carbon of step (a) is un-wetted.

5. The method of claim 1, wherein said distributing is achieved by mixing a weighed portion of said carbon dioxide into said activated carbon.

6. The method of claim 5, wherein said distributing provides a substantially even distribution of carbon dioxide on said activated carbon or a generally homogeneous mixture of carbon dioxide and activated carbon.

7. The method of claim 5, wherein said distributing provides an uneven distribution of carbon dioxide on said activated carbon.

8. The method of claim 1 wherein the contacting in step (c) is conducted to minimize metal leaching from the activated carbon.

9. The method of claim 8 wherein said metals comprise any metal oxide or hydroxide-containing species having an increased solubility in water of high alkalinity.

10. The method of claim 8 wherein said metals include aluminum and iron.

11. The method of claim 1 comprising a further step (d) of providing the treated water having a lower metals content.

12. The method of claim 1 wherein the contacting is conducted for about 15 to 45 minutes.

13. A method for preparing a carbon composition for treating water to control excessive pH in the treated water, said method comprising: loading a first activated carbon with carbon dioxide to about 0.1 to 1% by weight of said activated carbon, and adding said loaded first activated carbon to a second activated carbon, wherein said second activated carbon has a moisture level below about 15%, and wherein said carbon dioxide is in the form of solid carbon dioxide.

14. A method for treating a water to control excessive pH in the treated water, said method comprising the following steps:
   a. loading a bed of dry activated carbon with carbon dioxide to about 0.1 to 2% by weight of said activated carbon wherein the loading is conducted by distributing solid carbon dioxide throughout said activated carbon, and
   b. contacting said water with said activated carbon that is loaded with said carbon dioxide to produce the treated water.

15. The method of claim 14, wherein said distributing is achieved by mixing a weighed portion of said carbon dioxide into said activated carbon.

16. The method of claim 15, wherein said distributing provides a substantially even distribution of carbon dioxide on said activated carbon or a generally homogeneous mixture of carbon dioxide and activated carbon.

17. The method of claim 15, wherein said distributing provides an uneven distribution of carbon dioxide on said activated carbon.

* * * * *